(12) United States Patent
Geislinger (10) Patent No.: US 11,512,724 B2
(45) Date of Patent: Nov. 29, 2022

(54) FITTED BOLT CONNECTION

(71) Applicant: Ellergon Antriebstechnik Gesellschaft m.b.H., Hallwang (AT)

(72) Inventor: Matthias Geislinger, Hallwang (AT)

(73) Assignee: Ellergon Antriebstechnik Gesellschaft m.b.H., Hallwang (AT)

( * ) Notice: Subject to any disclaimer, the term of this patent is extended or adjusted under 35 U.S.C. 154(b) by 289 days.

(21) Appl. No.: 16/922,340

(22) Filed: Jul. 7, 2020

(65) Prior Publication Data

US 2021/0010497 A1    Jan. 14, 2021

(30) Foreign Application Priority Data

Jul. 8, 2019   (DE) ...................... 10 2019 118 453.3

(51) Int. Cl.
  *F16B 2/14*    (2006.01)
  *F16B 5/02*    (2006.01)
  *F16B 37/14*   (2006.01)

(52) U.S. Cl.
  CPC ............ *F16B 5/025* (2013.01); *F16B 37/145* (2013.01); *F16B 2/14* (2013.01)

(58) Field of Classification Search
  CPC .......... F16B 5/0642; F16B 5/025; F16B 2/14; F16B 5/02; F16B 37/145
  See application file for complete search history.

(56) References Cited

U.S. PATENT DOCUMENTS

| 4,279,530 A | 7/1981 | Mullenberg |
| 4,824,281 A | 4/1989 | Katsube |
| 5,269,622 A | 12/1993 | Müllenberg |
| 2009/0120234 A1* | 5/2009 | Aare ..................... F16C 11/045 74/580 |

FOREIGN PATENT DOCUMENTS

| DE | 38 16 523 A1 | 11/1989 |
| DE | 693 02 685 T2 | 1/1997 |
| DE | 10 2014 005 234 A1 | 1/2015 |
| EP | 0 816 703 A2 | 1/1998 |

(Continued)

OTHER PUBLICATIONS

Search Report and Written Opinion issued by the German Patent and Trademark Office, for corresponding German Patent Application No. 10 2019 118 453.3, dated Feb. 12, 2020, with English translation attached.

(Continued)

*Primary Examiner* — Jason L Vaughan
*Assistant Examiner* — Amanda Kreiling
(74) *Attorney, Agent, or Firm* — Myers Wolin, LLC (57) ABSTRACT

A fitted bolt connection is provided for connecting at least two components to holes to be matched comprises a fitted bolt having a conical surface for arrangement in a hole in the first component, three or more separate cone segments each for arrangement between the conical surface of the fitted bolt and an inner peripheral wall of the hole in the first component, and clamping bolts each associated with the cone segments, by means of which the cone segments, independently of one another, can each be individually clamped between the conical surface of the fitted bolt and the inner peripheral wall of the hole.

16 Claims, 4 Drawing Sheets

(56) References Cited

FOREIGN PATENT DOCUMENTS

| JP | S64-3330 A | | 1/1989 |
|---|---|---|---|
| JP | H04-507130 A | | 12/1992 |
| JP | 2003-239918 A | | 8/2003 |
| JP | 2003239918 A | * | 8/2003 |

OTHER PUBLICATIONS

Search Report and Written Opinion issued by the European Patent and Trademark Office, for corresponding European Patent Application No. 20180107.3, dated Nov. 6, 2020.
Notice of Reasons for Rejection issued by the Japanese Patent Office for Japanese Patent Application No. JP 2020-109750, dated Aug. 24, 2021.

* cited by examiner

FITTED BOLT CONNECTION

CROSS REFERENCE TO RELATED APPLICATIONS

This application claims priority under 35 USC § 119 to German Patent Application No. DE 10 2019 118 453.3, filed on Jul. 8, 2019, the contents of which are incorporated herein by reference.

FIELD OF THE INVENTION

The invention relates to a fitted bolt connection for connecting a first component to at least one second component. Fitted screws are usually used for this purpose, in which the shaft diameter is designed with a snug fit in the holes to be matched in the components to be interconnected in order to secure the position.

BACKGROUND

As far as possible, the holes to be matched on the components to be connected are drilled and reamed together so that they are exactly aligned with one another. However, this type of production together is not always possible. If the holes to be matched are made independently of one another, for example using a drill jig or using the corresponding coordinates, there are often slight deviations, especially with larger components, so that the holes are no longer exactly aligned with one another. In such a case, the fitted bolt only abuts a few points or even none at all. Furthermore, the holes to be matched to one another can have a slightly different diameter. Such a deviation cannot be compensated for with a conventional fitted bolt.

Remedial measures are often very complex in these cases. One possibility, for example, is to rework the corresponding holes, if this is at all possible. Often, fitted bolts cooled in liquid nitrogen are used, which shrink in diameter as a result and, after rapid insertion into the holes, heat up again and thus expand. This will cause the fitted bolt to become wedged in the holes to be matched. However, loosening the fitted bolt connection without destroying the fitted bolt connection becomes impossible. This procedure also requires a high degree of experience and equipment and therefore it is not readily available at places of work away from the workshop.

A further remedial measure is known from EP 0 816 703 A. It proposes making the fitted bolt connections by means of a conical screw connection, in which a conical inner bolt is axially clamped in a clamping bush having a correspondingly contoured conical through opening. If holes are not exactly aligned or holes have an unequal diameter, a fitted bolt connection is obtained by plastic deformation of the clamping sleeve. Plastic material deformations are generally undesirable or even unfeasible during assembly. Loosening the fitted bolt connection known from EP 0 816 703 A2 is generally not possible after plastic deformation without destroying the connection.

SUMMARY

Against this background, the invention is based on the object of creating an axially clampable and releasable fitted bolt connection for interconnecting at least two components that is capable of compensating for, in particular, misalignments of the holes to be matched in the two components to be connected at least to a certain extent.

This object is achieved by a fitted bolt connection. A fitted bolt connection according to the invention comprises a fitted bolt having a conical surface for arrangement in a hole in a first component, three or more separate cone segments each for arrangement between the conical surface of the fitted bolt and an inner peripheral wall of the hole in the first component, and clamping bolts each associated with the cone segments, by means of which the cone segments, independently of one another, can each be individually clamped between the conical surface of the fitted bolt and the inner peripheral wall of the hole.

The invention is based on the idea of axially positioning individual conical segments in their position in such a way that the conical segments are always pushed against the surrounding hole as well as against the fitted bolt, as a result of which the function of a fitted bolt connection is ensured over the circumference of the hole in question. This makes it possible to interconnect both non-aligned holes and holes of different diameters as a reliable fitted bolt connection. Loosening and reassembly of the fitted bolt connection is possible at any time. The operation can be carried out using simple assembly tools, which means that corrective measures can also be carried out at remote places of work.

Advantageous embodiments of the invention form the subject matter of further claims.

In a first variant of the embodiment, the fitted bolt connection further comprises a cap for axial support on the first component, which cap engages with the fitted bolt by means of a thread and has a tool attachment for screwing the cap against the fitted bolt. The clamping bolts for the cone segments are each rotatably received by an end portion on the cap and axially fixed on the cap by said end portion. The preloading force of the fitted bolt can be adjusted by means of screwing the cap, while the cone segments are brought into a position by means of the clamping bolt so that they each wedge between the conical surface of the fitted bolt and the inner peripheral wall of the hole. This can mean that the individual cone segments have to be inserted at different depths into the gap formed between the fitted bolt and the inner peripheral wall.

The position of the clamping bolts on the cap does not change their position when the cone segments are clamped, which means that a uniform external appearance is obtained in the assembled state and the ends of the clamping bolts do not protrude to different extents beyond the cap. A person skilled in the art coordinates the tightening torques for the cap and for the clamping bolts in such a way that a sufficient compressive force is guaranteed between the components to be clamped.

In order to move the cone segments, the clamping bolts preferably engage with the associated cone segment by means of a thread.

In order to screw the cap to the fitted bolt, an inside projection having an external thread can be provided on the cap in a further variant of the embodiment, which projection engages with a recess having an internal thread on the fitted bolt. The projection can be formed integrally with the cap or can be specially attached to the cap. Alternatively, it is possible to provide the internal thread on the cap and to screw it to an outer thread portion on the fitted bolt. However, the first-mentioned variant offers the advantage of an externally closed appearance.

According to a further advantageous embodiment of the invention, the clamping bolts for the cone segments have a head having a tool attachment on the outside of the cap and a collar on the inside of the cap. The diameter of the head and collar is larger than the diameter of the associated hole on the cap, in each case. The compressive force applied to each cone segment is supported against the inside of the cap by means of the collar, while the head makes an external operation possible and prevents the clamping bolts from being able to fall out of the cap during assembly. However, the diameter of the head can also be designed smaller than the associated hole on the cap and can be operated, for example, by means of a slot or hexagon socket. In this case, a guarantee that it will not fall out is not given.

The compensation principle explained above can be used individually at least for one of the holes to be matched to another, but optionally also for the two holes to be matched.

In a variant of the embodiment for two through-holes to be matched to one another, the fitted bolt can form a second conical surface for arrangement in a hole of a second component, which has a set angle opposing the first conical surface relative to the longitudinal axis of the fitted bolt. Second cone segments having second clamping bolts are arranged between the second conical surface and an inner peripheral wall of the second hole. Furthermore, a second cap corresponding to the first cap is provided, which second cap is supported axially on the second component, is screwed to the fitted bolt by means of a thread, and rotatably supports the second clamping bolts. During assembly, the fitted bolt can first be fixed in one of the appropriate holes using one of the caps having the associated clamping bolts and cone segments. Then the further cap having the associated further clamping bolts and cone segments is assembled from the opposite side of the component pairing. The compensation for any misalignments or deviations in diameter is divided into two points here, as a result of which larger deviations can be compensated for rather than if there is only a conical surface on the fitted bolt.

In a further variant of the embodiment, one of the caps is replaced by a collar formed on the fitted bolt for axial support. Accordingly, during assembly, the fitted bolt having the collar is first pushed into the holes to be matched. Then the cap having the clamping bolts and cone segments is assembled from the opposite side. This variant is suitable, for example, for applications in which a flange made of fiber composite material is intended to be connected to a metal flange. In this case, the collar is supported on the flange made of fiber composite material. A load on the inner peripheral wall of the hole in the fiber composite material due to the cone segments is avoided in this way.

Optionally, the fitted bolt can be formed in this case having a cylindrical fitting portion which fits precisely to the inner diameter of the through-hole of the second component, for example the aforementioned flange made of fiber composite material.

In a further variant of the embodiment, the fitted bolt forms a collar for axial support on the second component, while the clamping bolts for the cone segments are passed through the fitted bolt from the side of the collar, are supported by a head on the fitted bolt and are in threaded engagement with the cone segments. The fitted bolt can be clamped axially to the first component by means of a central clamping member. This variant allows one-sided assembly, for example if the hole in the first component is designed as a blind hole.

BRIEF DESCRIPTION OF THE DRAWINGS

The invention will be explained in more detail below with reference to embodiments shown in the drawings, in which.

DETAILED DESCRIPTION OF THE PREFERRED EMBODIMENTS

Figure 1:
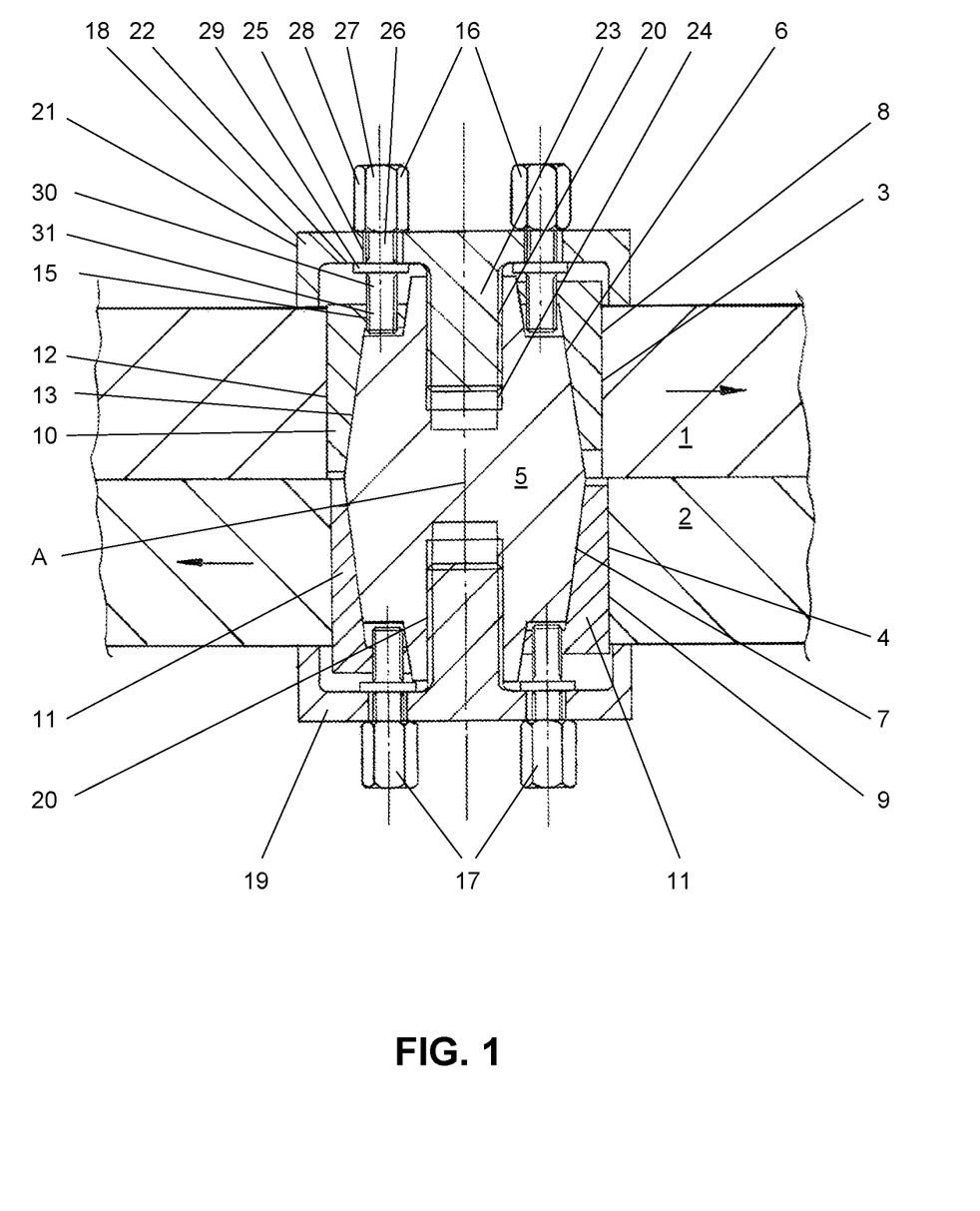
FIG. 1 shows a longitudinal sectional view of a first embodiment of a fitted bolt connection according to the invention.
Figure 2:
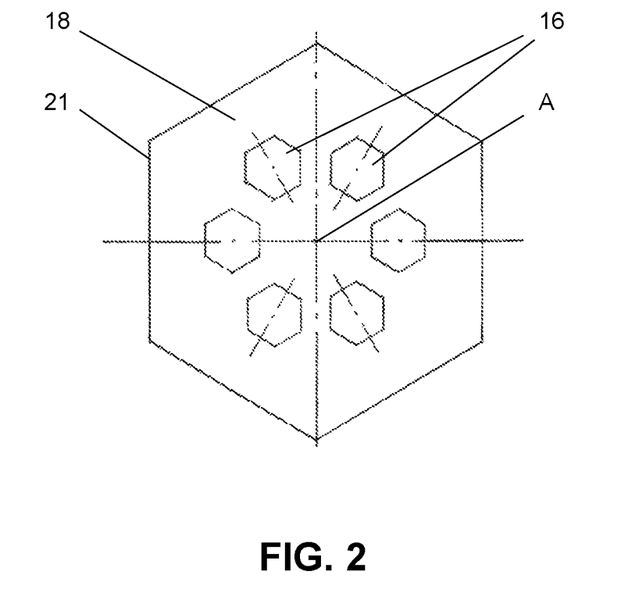
FIG. 2 shows a view of a cap of the fitted bolt connection according to FIG. 1.
Figure 3:
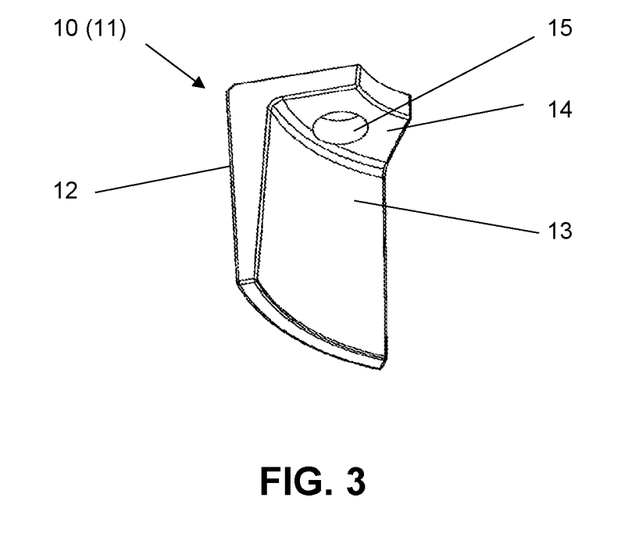
FIG. 3 shows a spatial view of a cone segment of the fitted bolt connection.

The first embodiment shown in FIGS. 1 to 3 shows a fitted bolt connection for connecting a first component 1 to a second component 2. The two components 1 and 2 have two holes 3 and 4 to be matched to one another, which, in the embodiment shown, are not exactly aligned with one another, but are offset from one another by a small offset. In addition, the holes 3 and 4 can differ slightly from one another in terms of their inner diameter. Instead of a one-section connection, the fitted bolt connection explained in more detail below can also be used in multi-section connections.

The holes 3 and 4 are designed as through-holes and are each accessible from the outside. To compensate for the misalignment shown, the fitted bolt connection first has a fitted bolt 5 which forms a first conical surface 6 for arrangement in the hole 3 in the first component 1 and a second conical surface 7 for arrangement in the hole 4 in the second component 2. The two conical surfaces 6 and 7 have opposing set angles relative to the longitudinal axis A of the fitted bolt 5. As will be explained in more detail below, however, embodiments are also possible in which only a first conical surface 6 is present on the fitted bolt 5.

The maximum outer diameter of the conical surfaces 6 and 7 is selected such that an annular gap is formed between these and the corresponding inner peripheral walls 8 and 9 of the holes 3 and 4.

The fitted bolt connection further comprises at least three, and in the present example six, cone segments 10 and 11 each for arrangement between the conical surface 6 or 7 of the fitted bolt 5 and the radially opposite inner peripheral wall 8 or 9 of the associated hole 3 or 4, respectively. The cone segments 10 and 11, one of which is shown in more detail in FIG. 3, are each inserted into the axially tapering annular gap. They are mutually spaced apart in the circumferential direction and do not touch each other.

As FIG. 3 shows, each of the cone segments 10 or 11 has a cylindrical outer wall portion 12 for abutting the corresponding inner peripheral wall 8 or 9, and a conical inner wall portion 13 for abutting the corresponding conical surface 6 or 7 of the fitted bolt 5.

Furthermore, each of the cone segments 10 or 11 has a radially inwardly directed wall portion 14, angled relative to the outer wall portion 12, on which a threaded hole 15 is provided, the axis of which preferably runs in parallel with the longitudinal axis A of the fitted bolt 5.

A clamping bolt 16 or 17 is associated with the cone segments 10 or 11. By means of the clamping bolts 16 or 17, cone segments 10 or 11, independently of one another, can each be individually clamped between the conical surface 6 or 7 of the fitted bolt 5 and the corresponding inner peripheral wall 8 or 9 of the hole 3 or 4.

For this purpose, the clamping bolts 16 and 17 each engage with the threaded holes 15 on the wall portions 14 of the cone segments 10 or 11. By turning the clamping bolts 16 or 17, the cone segments 10 or 11 can be displaced more or less deeply into the annular portion between the conical surface 6 or 7 on the fitted bolt 5 and the corresponding inner peripheral wall 8 or 9. This makes it possible to compensate for different radial gap widths of the annular gap.

In the first embodiment, the clamping bolts 16 and 17 are each axially supported on a cap 18 and 19.

FIG. 1 shows a first cap 18 for axial support on the first component 1, which cap engages with the fitted bolt 5 by means of a thread 20. Furthermore, the first cap 18 has a tool attachment 21 for screwing the first cap 18 against the fitted bolt 5. In the embodiment shown, the first cap 18 has a hexagonal shape for this purpose. However, other tool attachments 21 are also possible on the first cap 18.

In the present case, the thread 20 on the first cap 18 is designed, for example, as an external thread on a projection 23 provided on the inside 22 facing the fitted bolt 5. The projection 23 can be formed integrally with the first cap 18 or can be specially attached to it. On the fitted bolt 5 there is a corresponding internal thread 24 by means of which the projection 23 engages with its external thread. By changing the screw-in depth, the fitted bolt 5 can be positioned axially in the holes 3 and 4. In addition, the preloading force required for connecting the first and second components 1 and 2 is applied by screwing the two caps 18 or 19 against the fitted bolt 5, as will be explained in more detail below.

The first cap 18 has further holes 25 for mounting the first clamping bolts 16 for the first cone segments 10. The first clamping bolts 16 are each rotatably received by an end portion 26 on the first cap 18 and axially fixed on the first cap 18 by said end portion 26.

In the first embodiment shown, the first clamping bolts 16 have, without limitation, a head 27 having a tool attachment 28 on the outside of the cap and a collar 29 on the inside of the cap. A shaft portion 30 having an externally threaded portion 31 extends from the collar 29 into the threaded opening 15 of the first cone segment 10.

At least the collar 29, but preferably both the collar 29 and the head 27, have a diameter which is larger than the diameter of the associated hole 25 on the first cap 18.

The force with which the associated cone segment 10 is pressed into the annular gap is axially supported by means of the collar 29. The head 27 is used to clamp and loosen the associated cone segment 10 from the outside.

In the first embodiment, as already mentioned, two conical surfaces 6 and 7 are provided on the fitted bolt 5 for each of the holes 3 and 4. The components for exactly fixing the first conical surface 6 in the associated hole 3 on the first component 1 were explained above. The second conical surface 7 can be fixed in the hole 4 of the second component 2 using analog components.

Accordingly, in FIG. 1, second cone segments 11 can be seen between the second conical surface 7 and an inner peripheral wall 9 of the second hole 4 by means of second clamping bolts 17, a second cap 19 corresponding to the first cap 18 being axially supported on the second component 2. This second cap 19 is in turn screwed to the fitted bolt 5 by means of a thread 20, which, as already described for the first clamping bolt 16, rotatably supports the second clamping bolt 17.

When assembling the fitted bolt connection according to the first embodiment, the cone segments 10 and 11 on the first and second caps 18 and 19, respectively, are first brought into a retracted position by actuating the associated clamping bolts 16 and 17, by their wall portions 14 being moved in the direction of the inside of the cap 22 in each case.

The fitted bolt 5 is then inserted into the holes 3 and 4 to be matched in the first and second components 1 and 2. The first cap 18 together with its first cone segments 10 and first clamping bolts 16 is then inserted into the hole 3 of the first component 1, it being possible for the ends of the cone segments 10 already in loose engagement with the annular gap to reach between the first conical surface 6 and the inner wall portion 8 of the hole 3.

The longitudinal axis A of the fitted bolt 5 is brought as close as possible to the center between the longitudinal central axes of the holes 3 and 4, which are somewhat offset from one another. The fitted bolt 5 is then fixed in this position by screwing the first cap 18 against the fitted bolt 5 and tightening the first clamping bolts 16 in order to radially fix the desired position of the fitted bolt 5 by moving the first cone segments 10 into the annular gap.

In a modification of this procedure, the fitted bolt 5 can initially also be loosely mounted on the first cap 18 and inserted into the hole 3 together with said cap.

After the longitudinal axis A of the fitted bolt 5 has been fixed, the second cap 19 together with its second cone segments 11 and second clamping bolts 17 is mounted from the opposite side. The second cone segments 11 come into loose engagement with the annular gap formed between the second conical surface 7 of the fitted bolt and the inner peripheral wall 9 of the hole 4 of the second component 2.

Next, the second cap 19 is tightened against the fitted bolt 5, as a result of which the actual preloading force of the fitted bolt connection is generated in order to press the first and second components 1 and 2 against one another.

Finally, the second clamping bolts 17 are operated in order to press the second cone segments 11 into contact in the annular gap between the second conical surface 7 and the inner peripheral wall 9 of the hole 4 such that they are supported radially against the inner peripheral wall 9 by their outer wall portion 12 and they are supported radially against the second conical surface 7 of the fitted bolt 5 by their conical inner wall portion 13. In this way, a residual offset existing between the longitudinal axis A of the fitted bolt 5 and the longitudinal central axis of the hole 4 of the second component 2 and any existing difference in diameter between the holes 3 and 4 to be matched are compensated for.

By means of the clamping bolts 16 and 17, the pressure force between the first and second components 1 and 2 applied by means of the caps 18 and 19 is somewhat reduced, which must be taken into account when designing the fitted bolt connection.

After assembly, a corresponding fine adjustment of the tightening torques of all clamping bolts 16 and 17 and caps 18 and 19 can be carried out.

By screwing back the first and second cone segments 10 and 11 and then unscrewing the first and second caps 18 and 19 from the fitted bolt 5, the fitted bolt connection can be easily released and, if necessary, re-installed. The assembly and disassembly can be done with conventional torque wrenches. No special tools are required for this, and therefore assembly and disassembly are possible even at remote places of work outside the workshop.

The invention thus makes it possible to use non-aligned holes and/or holes with slightly different inner diameters for a fitted bolt connection.

The fitted bolt connections can be used for all industrial sectors and can be made of different materials or coated with different materials.

These are preferably used to connect large flanges, but can also be used for other single- and multi-section connections.

Numerous modifications of the first embodiment shown are possible.

Figure 4:
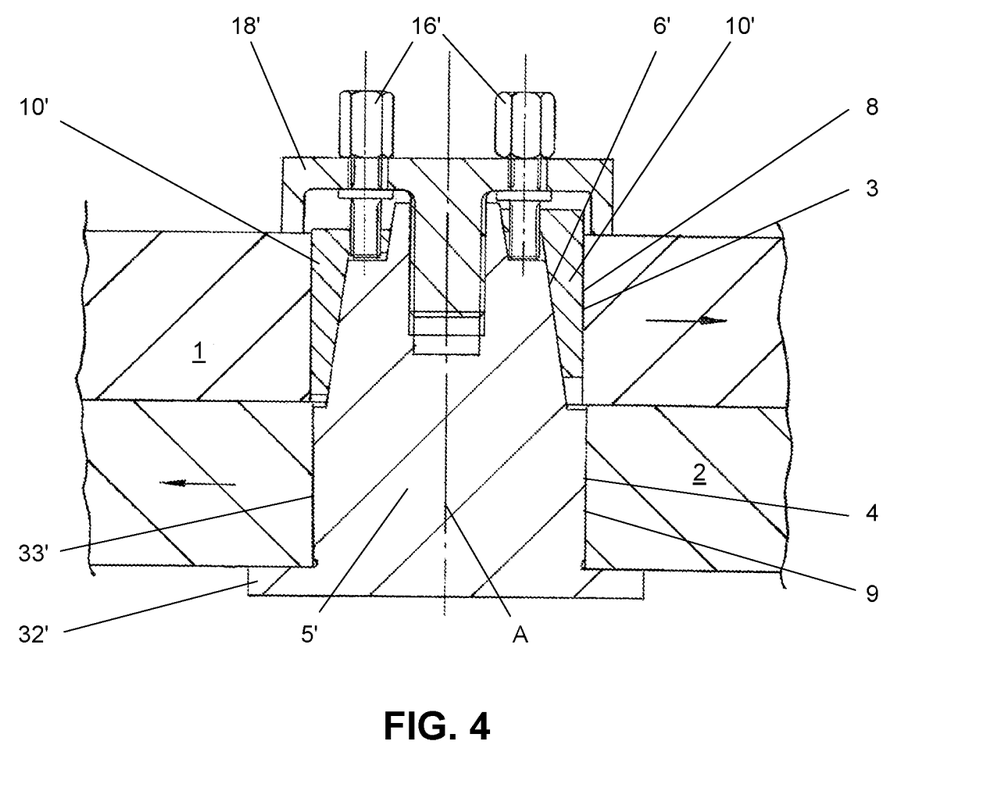
FIG. 4 shows a longitudinal sectional view of a second embodiment of a fitted bolt connection according to the invention.
Figure 5:
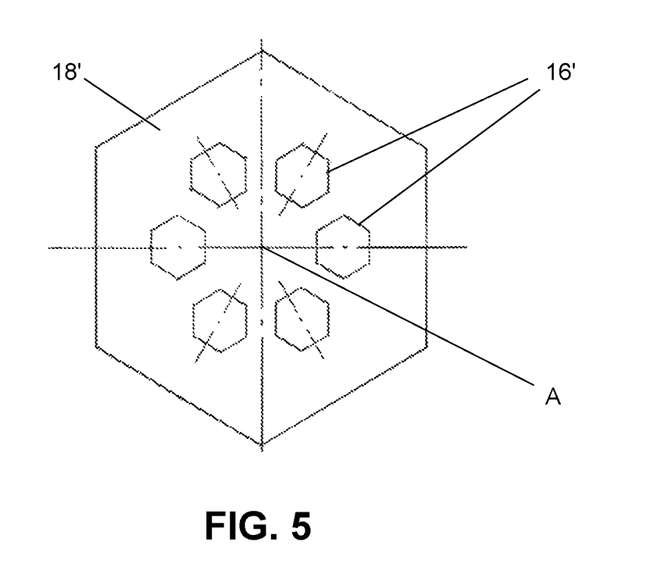
FIG. 5 shows a view of a cap of the fitted bolt connection according to FIG. 4.

A second embodiment is shown in FIGS. 4 and 5, in which a deviation is only compensated for by means of a hole.

The fitted bolt connection of the second embodiment in turn comprises a fitted bolt 5' having a conical surface 6' for arrangement in a hole 3 of a first component 1. As in the first embodiment, three or more separate cone segments 10' are also provided here each for arrangement between the conical surface 6' of the fitted bolt 5' and an inner peripheral wall 8 of the hole 3 of the first component 1. The cone segments 10' are each associated with a clamping bolt 16', by means of which the cone segments 10', independently of one another, can be individually clamped between the conical surface 6' of the fitted bolt 5' and the inner circumferential wall 8 of the hole 3. Furthermore, the fitted bolt connection of the second embodiment has a cap 18' which is screwed to the fitted bolt 5' and rotatably supports the clamping bolt 16.

The cone segments 10', the clamping bolts 16' and the cap 18' can be designed like the corresponding components of the first embodiment, and therefore reference is made to the above statements in this regard.

In contrast to the first embodiment, the fitted bolt 5' of the second embodiment forms a collar 32' for axial support on the second component 2.

In addition, a cylindrical fitting portion 33' can be provided on the fitted bolt 5' of the second embodiment, which fitting portion is designed to fit exactly the inner diameter of the hole 4 to be matched in the second component 2. In particular, a transition fit can be provided between the fitting portion 33' and the inner peripheral wall 9 of the hole 4 in the second component 2, which fit is particularly suitable for installation in a second component 2 made of fiber composite material. This avoids radial loading of the inner peripheral wall 9 of the second component 2. In particular, the radial pressure stress due to the cone segments 11 is eliminated as in the first embodiment. This is particularly advantageous for sensitive materials.

When assembling a fitted bolt connection according to the second embodiment, the fitted bolt 5' is first pushed into the holes 3 and 4 to be matched from the side of the second component 2 until its collar 32' comes into contact with the second component 2.

The cap 18' is then mounted on the fitted bolt 5' with the cone segments 10' withdrawn. In this case, the cone segments 10' initially come loosely into the annular gap formed between the conical surface 6' and the inner circumferential wall 8 of the hole 3 in the first component 1.

Subsequently, the cap 18' is screwed against the fitted bolt 5' until a desired preload force level is reached approximately. Finally, the clamping bolts 16' are actuated until the cone segments 10' each become wedged between the conical surface 6' of the fitted bolt 5' and the inner peripheral wall 8 of the hole 3. Finally, the tightening torques can be finely adjusted.

Loosening and reusing the fitted connection is also possible here in a non-destructive manner by the cone segments 10' being moved out of the annular gap by means of the clamping bolts 16' and the cap 18' being loosened.

Figure 6:
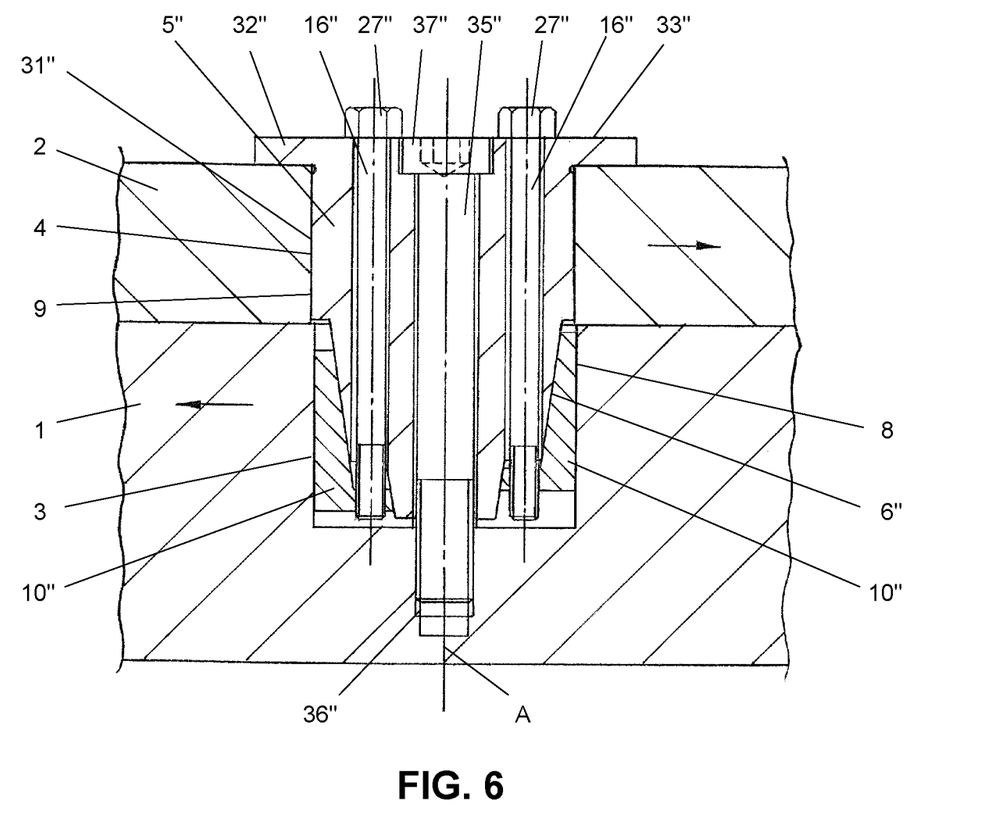
FIG. 6 shows a longitudinal sectional view of a third embodiment of a fitted bolt connection according to the invention.
Figure 7:
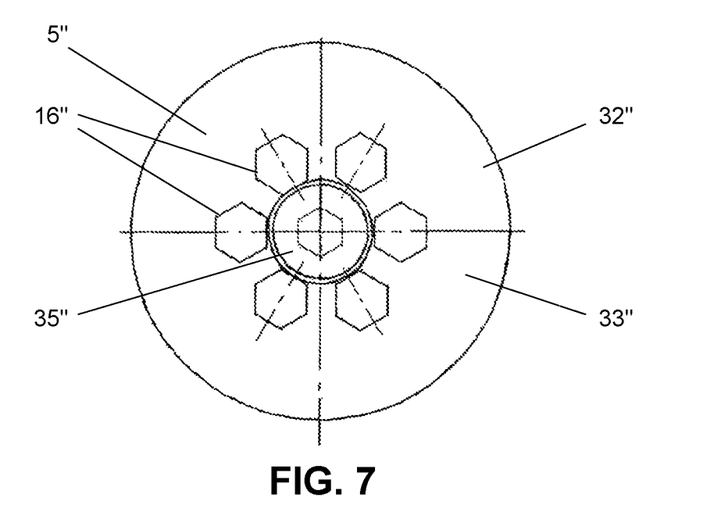
FIG. 7 shows a view of the outer end face of the fitted bolt connection according to FIG. 6.

FIGS. 6 and 7 show a third embodiment, in which, as in the second embodiment, a deviation is only compensated for by means of a hole. In contrast to the second embodiment, assembly is possible from only one side of the fitted bolt connection. This can be of advantage, for example, in confined spaces or if the first component is designed accordingly. It is suitable, for example, for applications in which there is only a blind hole in the first component instead of a through opening.

The fitted bolt connection of the third embodiment has a fitted bolt 5" having a conical surface 6" for arrangement in a hole 3 in a first component 1. As can be seen in FIG. 6, the first hole 3 is designed here as a blind hole, while the second hole 4 is a through opening into which the fitted bolt 5" having its cylindrical fitting portion 31" can be inserted with a precise fit. The inner peripheral wall 9 of the hole 4 of the second component 2 has, for example, a transition fit to the fitting portion 31".

At least three, for example six, separate cone segments 10" are arranged between the conical surface 6" of the fitted bolt 5" and an inner circumferential wall 8 of the hole 3 in the first component 1, each of which is associated with a clamping bolt 16". By means of the clamping bolts 16", the cone segments 10", independently of one another, can be individually clamped between the conical surface 6" of the fitted bolt 5" and the inner circumferential wall 8 of the hole 3. A separate cap is not required here.

The fitted bolt 5" of the third embodiment forms a collar 32" for axial support on the second component 2, which in the present case has a hole 4 designed as a through opening.

The clamping bolts 16" for the cone segments 10" are passed through the fitted bolt 5" from the side of the collar 32". They each have a head 27", which can be supported, for example, on an outside end face wall 33" of the fitted bolt 5". The clamping bolts 16" are each in threaded engagement with one of the cone segments 10", it being possible for said cone segments to be designed as shown in FIG. 3. Preferably, the cone segments 10" and the clamping bolts 16" are loosely mounted on the fitted bolt 5" before the fitted bolt 5" is inserted into the holes 3 and 4.

The fitted bolt 5" can be clamped axially to the first component 1 by means of a central clamping member 35". The central clamping member 35" can be designed, for example, as a clamping bolt which is passed from the outside end face wall 33" of the fitted bolt 5" through the fitted bolt 5" and is screwed to a corresponding threaded portion 36" of the first component 1. A head 37" is supported on the outside of the clamping member 5".

The invention has been explained in detail above with reference to embodiments and further modifications. The embodiments and the modifications serve to prove the feasibility of the invention. Technical individual features which were explained above in the context of further individual features can also be implemented independently of said further individual features and in combination with other individual features, even if this is not expressly described, as long as this is technically possible. The invention is therefore expressly not limited to the embodiments specifically described, but includes all designs defined by the claims.

What is claimed is:

1. A fitted bolt connection comprising:
a fitted bolt having a conical surface for arrangement in a hole in a first component,
three or more separate cone segments each for arrangement between the conical surface of the fitted bolt and an inner peripheral wall of the hole in the first component, and
clamping bolts each engaged with one of the cone segments, respectively, for individually clamping the cone segments between the conical surface of the fitted bolt and the inner peripheral wall of the hole independently of one another,
wherein the cone segments each have a cylindrical outer wall portion and a conical inner wall portion and are mutually spaced apart in a circumferential direction about the fitted bolt and do not touch each other.

2. The fitted bolt connection of claim 1 further comprising a cap for axial support on the first component, which cap engages with the fitted bolt by means of a thread and has a tool attachment for screwing the cap against the fitted bolt, wherein the clamping bolts for the cone segments are each rotatably received by an end portion on the cap and axially fixed on the cap by said portion.

3. The fitted bolt connection of claim 2, wherein an inside projection having an external thread is provided on the cap, which projection engages with a recess having an internal thread on the fitted bolt.

4. The fitted bolt connection of claim 2, wherein the fitted bolt has a second conical surface for arrangement in a hole of a second component, which second conical surface has a set angle opposing the first conical surface and relative to the longitudinal axis of the fitted bolt,
wherein second cone segments are arranged between the second conical surface and an inner peripheral wall of the second hole by means of second clamping bolts, and
wherein a second cap corresponding to said cap for axial support on the first component is axially supported on the second component, is screwed to the fitted bolt by means of a thread, and rotatably supports the second clamping bolts.

5. The fitted bolt connection of claim 1, wherein the clamping bolts for the cone segments have a head having a tool attachment on the outside of the cap and a collar on the inside of the cap, the diameter of the head and/or collar being larger than the diameter of an associated hole on the cap.

6. The fitted bolt connection of claim 1, wherein the fitted bolt forms a collar for axial support on the second component.

7. The fitted bolt connection of claim 1, wherein the clamping bolts are each engaged with the associated cone segment by means of a threaded section.

8. A fitted bolt connection comprising:
a fitted bolt having a first conical surface for arrangement in a hole in a first component,
three or more separate first cone segments each for arrangement between the first conical surface of the fitted bolt and an inner peripheral wall of the hole in the first component, and
first clamping bolts each engaged with one of the first cone segments, respectively, for individually clamping the first cone segments between the first conical surface of the fitted bolt and the inner peripheral wall of the hole independently of one another,
a first cap for axial support on the first component, which first cap engages with the first fitted bolt by means of a thread and has a tool attachment for screwing the first cap against the fitted bolt, wherein the first clamping bolts for the first cone segments are each rotatably received by an end portion on the first cap and axially fixed on the first cap by said portion,
said fitted bolt having a second conical surface for arrangement in a hole of a second component, which second conical surface has a set angle opposing the first conical surface and relative to the longitudinal axis of the fitted bolt,
second cone segments each for arrangement between the second conical surface and an inner peripheral wall of the second hole by means of second clamping bolts, and
a second cap configured to be axially supported on the second component, which is screwed to the fitted bolt by means of a thread and rotatably supports the second clamping bolts,
wherein the first and second cone segments each have a cylindrical outer wall portion and a conical inner wall portion and are mutually spaced apart in a circumferential direction about the fitted bolt and do not touch each other.

9. The fitted bolt connection of claim 8, wherein an inside projection having an external thread is provided on the first cap, which projection engages with a recess having an internal thread on the fitted bolt.

10. The fitted bolt connection of claim 8, wherein the first and second clamping bolts for the first and second cone segments have a head having a tool attachment on the outside of the corresponding first or second cap and a collar on the inside of the corresponding first or second cap, the diameter of the head and/or collar being larger than the diameter of an associated hole on the corresponding first or second cap.

11. The fitted bolt connection of claim 8, wherein the first and second clamping bolts are respectively engaged with the associated first and second cone segment by means of a threaded section.

12. A fitted bolt connection, comprising:
a fitted bolt having a conical surface for arrangement in a hole in a first component,
three or more separate cone segments each for arrangement between the conical surface of the fitted bolt and an inner peripheral wall of the hole in the first component, and
clamping bolts each engaged with one of the cone segments, respectively, for individually clamping the cone segments between the conical surface of the fitted bolt and the inner peripheral wall of the hole independently of one another,
wherein the fitted bolt forms a collar for axial support on the second component, the clamping bolts for the cone segments are passed from the side of the collar through to the fitted bolt, are supported by a head on the fitted bolt and are in threaded engagement with the cone segments.

13. The fitted bolt connection of claim 12, wherein a central clamping member is provided for axially clamping the fitted bolt to the first component.

14. The fitted bolt connection of claim 12, wherein the fitted bolt forms a cylindrical fitting portion fitting precisely to the inner diameter of a hole of the second component.

15. The fitted bolt connection of claim 12, wherein the clamping bolts are each engaged with the associated cone segment by means of a threaded section.

16. The fitted bolt connection of claim 12, wherein the cone segments have a cylindrical outer wall portion and a conical inner wall portion.

\* \* \* \* \*